No. 881,564. PATENTED MAR. 10, 1908.
G. EPSTEIN,
STRAINER FOR COFFEE URNS.
APPLICATION FILED JUNE 25, 1907.
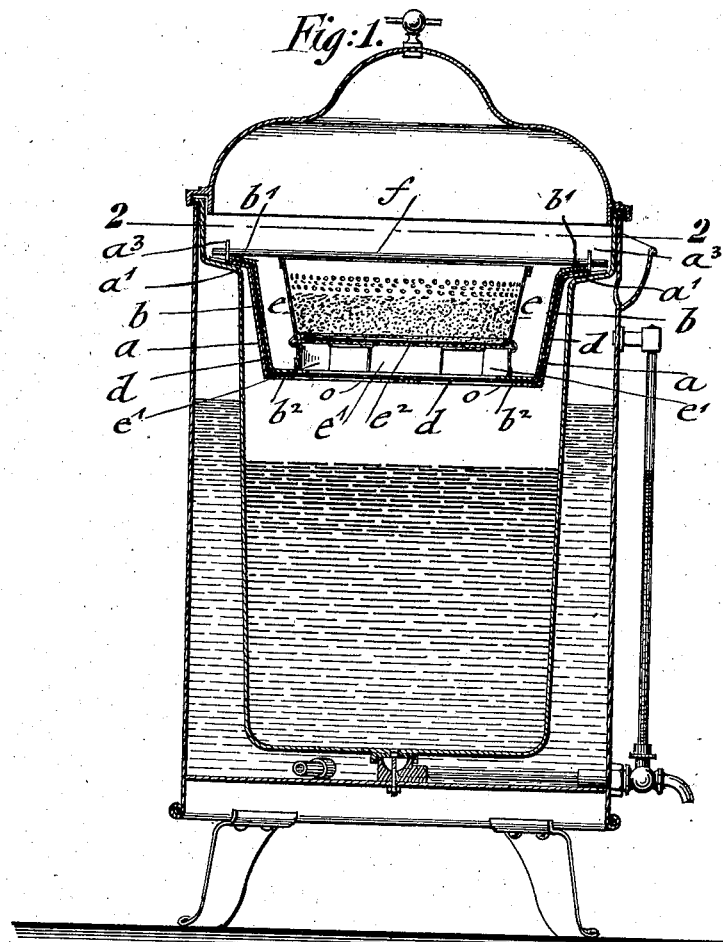
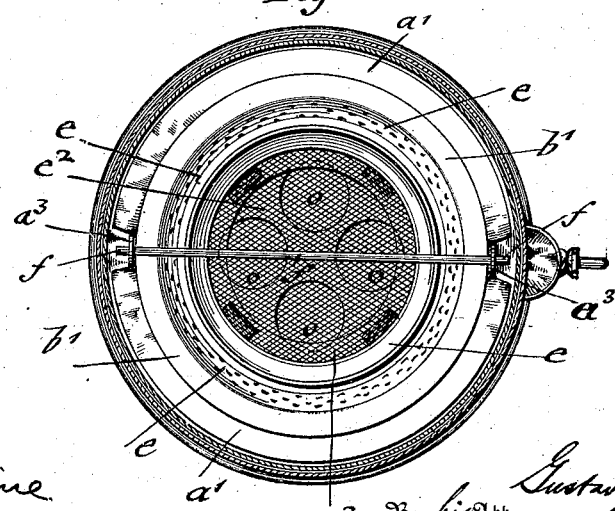

UNITED STATES PATENT OFFICE.

GUSTAV EPSTEIN, OF NEW YORK, N. Y.

STRAINER FOR COFFEE-URNS.

No. 881,564.  Specification of Letters Patent.  Patented March 10, 1908.

Application filed June 25, 1907. Serial No. 380,743.

*To all whom it may concern:*

Be it known that I, GUSTAV EPSTEIN, a citizen of the United States, residing in New York, in the borough of Manhattan, county and State of New York, have invented certain new and useful Improvements in Strainers for Coffee-Urns, of which the following is a specification.

This invention relates to an improved strainer for coffee-urns.

In the well-known coffee-urns that are generally used in coffee-houses, restaurants, hotels and other places, the ground coffee is placed in bags and suspended in the upper part of the urns. After some time the bag assumes a disagreeable smell due to the empyreumatic oils contained in the coffee, which impart a disagreeable flavor to the coffee prepared therein. Even by a careful washing of the bags, this disagreeable taste cannot be obviated, and it forms an objection to the use of the urns.

The object of this invention is to furnish a strainer to be used in connection with coffee-urns by which an effective straining of the ground coffee is obtained, while the use of a bag for the ground coffee and the objection thereto is entirely eliminated owing to the fact that whenever a new quantity of ground coffee is placed in the strainer, the straining-cloth, used in connection with the strainer is renewed, and not used a second time, so that coffee of clear and unobjectionable taste and quality is obtained; and for this purpose the invention consists of a strainer for coffee-urns which comprises an exterior body having a perforated bottom and a circumferential flange resting on an interior shoulder of the urn, an interior flanged cup open at the bottom, an intermediate layer of straining-cloth, an interior perforated cup provided with a strainer at the bottom for receiving the ground coffee and supporting legs, and means for retaining the interior flanged cup and strainer-cup in position in the main body of the strainer, as will be fully described hereinafter and finally pointed out in the claims.

In the accompanying drawings, Figure 1 represents a vertical central section of a coffee-urn showing my improved strainer in position therein, and Fig. 2 is partly a plan-view of the strainer and partly a horizontal section through the coffee-urn on line 2, 2, Fig. 1.

Similar letters of reference indicate corresponding parts throughout the several figures.

Referring to the drawings, $a$ represents the conically-tapering main-body of my improved strainer for coffee-urns which body is pressed out of suitable sheet-metal and provided with an outwardly-bent flange $a^1$ at its upper circumference, which flange rests on an interior shoulder of the urn proper. The bottom of the main-body $a$ is provided with openings $o$ for permitting the free passage of water through the same. The flange $a^1$ is recessed at diametrically-opposite points and the stock of the same bent up so as to form perforated ears $a^3$. At the interior of the body $a$ is arranged a closely-fitting cup $b$, which is provided with a flange $b^1$ which fits over the flange $a^1$ of the main-body $a$, and with an inwardly-bent bottom rim $b^2$, said interior cup holding, in connection with the main-body an intermediate piece of straining cloth $d$, so that it cannot change its position under the pressure at the interior of the urn. The straining-cloth $d$ is made of round or square shape, and cut out by suitable dies from a suitable fabric, which may be a cheap muslin or cheese cloth. It can be readily removed from the strainer and replaced by a new one whenever a new quantity of ground coffee is supplied to the urn. The ground coffee is placed into a perforated strainer-cup $e$ which is supported by legs $e^1$ at the interior of the cup $b$ and main-body $a$ and provided at its bottom with a screen $e^2$ of wire cloth. A retaining-rod $f$ is then placed through the perforated ears $a^3$ and across the strainer-cup $e$, so as to hold all the parts firmly in position in the main-body $a$. Steaming hot water is then passed through the strainer-cup and the ground coffee in the same and through the interior cup, straining-cloth and main-body, so as to extract all the necessary strength of the coffee without imparting any disagreeable taste to the same. The lid is then placed in position on the exterior shelter casing of the urn. When new coffee is to be made, the lid of the urn is removed, the strainer taken out of the urn, the grounds thrown away, the straining-cloth removed and replaced by a new cloth, which is placed in position between the outer main-body and the interior holding-cup. Fresh ground coffee is then placed in the strainer-cup and boiling water passed through the same as before. By the interior strainer-cup with its side-perforation and bottom-screen the hot water passes quickly through the coffee and prevents thereby the closing up of the straining cloth and the retarding of the passage of the water.

Having thus described my invention, I claim as new and desire to secure by Letters Patent:

1. A strainer for coffee-urns consisting of an exterior main-body provided with a circumferential flange and bottom-openings, and interior cup fitting into the main-body also provided with an outwardly bent circumferential flange and an inwardly-bent bottom-flange, a straining-cloth interposed between the outer body and interior cup, a perforated strainer-cup for the ground coffee provided with supporting legs and bottom-screen, and means for holding the strainer-cup, interior cup and straining-cloth in position in the exterior main-body.

2. A strainer for coffee-urns consisting of an exterior body provided with openings in its bottom and an outwardly-bent flange at its upper edge provided with bent-up perforated lugs at diametrically-opposite points, an interior cup also provided with an open bottom and an outwardly-bent flange at the upper end, said cup fitting in the outer body, a straining-cloth interposed between the exterior body and the interior cup, a perforated strainer-cup for the ground coffee provided with a screen-bottom and placed inside of the interior cup, and a transverse rod passed through the perforated ears of the exterior body and across the strainer-cup for holding the parts in position in the exterior body.

In testimony, that I claim the foregoing as my invention, I have signed my name in presence of two subscribing witnesses.

GUSTAV EPSTEIN.

Witnesses:
 PAUL GOEPEL,
 FANNIE FISK.